US012677321B2

(12) United States Patent
Xu et al.

(10) Patent No.: US 12,677,321 B2
(45) Date of Patent: Jul. 7, 2026

(54) RANDOM ACCESS METHOD AND APPARATUS

(71) Applicant: HUAWEI TECHNOLOGIES CO., LTD., Shenzhen (CN)

(72) Inventors: Bin Xu, Beijing (CN); Bingzhao Li, Beijing (CN); Lei Chen, Beijing (CN); Xuelong Wang, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 572 days.

(21) Appl. No.: 17/547,943

(22) Filed: Dec. 10, 2021

(65) Prior Publication Data

US 2022/0104274 A1     Mar. 31, 2022

Related U.S. Application Data

(63) Continuation of application No. PCT/CN2020/091651, filed on May 21, 2020.

(30) Foreign Application Priority Data

Jun. 12, 2019     (CN) .......................... 201910506817.9

(51) Int. Cl.
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ......... H04W 74/0833; H04W 74/0836; H04W 74/0838; H04W 74/0841; H04W 74/0858;
(Continued)

(56) References Cited

U.S. PATENT DOCUMENTS

2017/0041916 A1     2/2017  Soret et al.
2017/0273108 A1     9/2017  Damnjanovic et al.
(Continued)

FOREIGN PATENT DOCUMENTS

CN          102307387 A     1/2012
CN          103348746 A     10/2013
(Continued)

OTHER PUBLICATIONS

3GPP TR 38.821 V0.6.0 (Apr. 2019), "3rd Generation Partnership Project; Technical Specification Group Radio Access Network; Solutions for NR to support non-terrestrial networks (NTN) (Release 16)," Apr. 2019, 55 pages.
(Continued)

*Primary Examiner* — Brian T Le
(74) *Attorney, Agent, or Firm* — Fish & Richardson P.C.

(57)          ABSTRACT

Embodiments of this application disclose a random access method and apparatus. In one example method, when a terminal device supports positioning, the terminal device may adjust, based on a positioning capability, time for sending a preamble on a RACH Occasion (RO) resource. When the terminal device does not support positioning, a corresponding RO resource periodicity may be configured to be large. Therefore, regardless of whether the terminal device supports positioning, a network device can receive, at the same time or in a short preamble receiving time window, preambles sent on a same RO resource, and receive, at different time, in different small time ranges, or in different short preamble receiving time windows, preambles sent on different RO resources.

20 Claims, 6 Drawing Sheets

(58) Field of Classification Search
CPC ......... H04W 74/0866; H04W 74/0875; H04W 74/0883; H04W 74/0891
See application file for complete search history.

(56) References Cited

U.S. PATENT DOCUMENTS

| 2018/0167979 | A1 | 6/2018 | Guo et al. | |
| 2019/0223214 | A1* | 7/2019 | Jiang | H04W 72/0446 |
| 2020/0107286 | A1* | 4/2020 | Akkarakaran | H04L 41/08 |
| 2021/0212124 | A1* | 7/2021 | Wakabayashi | G01S 5/0236 |
| 2022/0167301 | A1* | 5/2022 | Goyal | G01S 5/12 |

FOREIGN PATENT DOCUMENTS

| CN | 105247950 | A | 1/2016 |
| CN | 108633050 | A | 10/2018 |
| CN | 109548039 | A | 3/2019 |
| EP | 3537794 | A1 | 9/2019 |
| WO | 2018084498 | A1 | 5/2018 |
| WO | 2018084662 | A1 | 5/2018 |
| WO | 2018112918 | A1 | 6/2018 |
| WO | 2018212906 | A1 | 11/2018 |
| WO | 2019086309 | A1 | 5/2019 |

OTHER PUBLICATIONS

Intel Corporation, "Support of On demand SI for broadcast of assistance data," 3GPP TSG RAN WG2 Meeting #106, R2-1906361, Reno, USA, May 13-17, 2019, 6 pages.
Office Action issued in Chinese Application No. 201910506817.9 on Aug. 27, 2021, 16 pages (with English translation).
PCT International Search Report and Written Opinion issued in International Application No. PCT/CN2020/091651 on Aug. 19, 2020, 13 pages (with English translation).
Extended European Search Report issued in European Application No. 20822028.5 on Jun. 20, 2022, 10 pages.

* cited by examiner

700

800

RANDOM ACCESS METHOD AND APPARATUS

CROSS-REFERENCE TO RELATED APPLICATIONS

This application is a continuation of International Application No. PCT/CN2020/091651, on May 21, 2020, which claims priority to Chinese Patent Application No. 201910506817.9, filed on Jun. 12, 2019. The disclosures of the aforementioned applications are hereby incorporated by reference in their entireties.

TECHNICAL FIELD

This application relates to the field of mobile communication technologies, and in particular, to a random access method and apparatus.

BACKGROUND

In a wireless communication process, uplink synchronization needs to be implemented between a terminal device and a network device through a random access procedure, to perform subsequent communication. Before random access, the network device broadcasts a random access channel occasion (Random Access Channel Occasion, RACH Occasion for short or RO for short) resource to the terminal device, and the terminal device performs random access based on the RO resource broadcast by the network device. The RO resource includes a time domain resource and a frequency domain resource, One RO resource may also be referred to as one RACH resource.

The random access procedure mainly includes the following steps:

Step 1: The terminal device selects a random access preamble (random access preamble, preamble for short), and sends the preamble on the RO resource.

Main functions of the preamble are to notify, to the network device, that the terminal device initiates a random access request, and enable the network device to estimate a transmission delay between the network device and the terminal device. Specifically, the network device may determine the transmission delay between the network device and the terminal device based on sending time and receiving time of the preamble. A RACH resource corresponding to the RO resource may indicate the sending time of the preamble.

Step 2: After sending the preamble, the terminal device calculates a random access radio network temporary identifier (Random Access Radio Network Temporary Identifier, RA-RNTI) based on the RO resource for sending the preamble, and receives, in a random access response (Random Access Response, RAR) receiving window by using the RA-RNTI, a RAR identified by the network device by using a RA-RNTI.

The terminal device can correctly receive the RAR only when the network device and the terminal device use a same RA-RNTI. To ensure that the network device and the terminal device use the same RA-RNTI, the network device and the terminal device need to calculate the RA-RNTI by using a time-frequency position of a same RO resource.

If the terminal device does not correctly receive, in the RAR receiving window, the RAR sent by the network device, step 1 is repeatedly performed.

The foregoing random access procedure is usually applied to a scenario in which distances between different terminal devices in a cell of a same network device and the network device differ slightly, or it is understood as that transmission delays between the different terminal devices and the network device differ slightly. Therefore, for different terminal devices that select a same RO resource to send preambles, during sending of the preambles, time points at which the preambles arrive at the network device differ slightly.

However, in some other scenarios (for example, a non-terrestrial network (Non-terrestrial Network, NTN) communication scenario, where a network device is located on a satellite), distances between different terminal devices in a cell of a same network device and the network device differ greatly. Consequently, transmission delays between the different terminal devices and the network device differ greatly, and for different terminal devices that select a same RO resource to send preambles, time points at which the preambles arrive at the network device differ greatly.

For example, FIG. 2 is a schematic diagram of sending preambles by different terminal devices by using a same RO resource. A terminal device 1 is a terminal device closest to a network device, and a terminal device 2 is a terminal device farthest from the network device. In addition, a delay in sending information (for example, a preamble) by the terminal device 1 to the network device is a minimum one-trip delay in sending information by all terminal devices served by the network device to the network device, and is represented by MinDelay, and a delay in sending information (for example, a preamble) by the terminal device 2 to the network device is a maximum one-trip delay in sending the information by all the terminal devices served by the network device to the network device, and is represented by MaxDelay.

It can be learned from FIG. 2 that when different terminal devices send preambles by using a same RO resource, the network device first receives the preamble sent by the terminal device 1, a delay from a time point at which the terminal device 1 sends the preamble to a time point at which the network device receives the preamble sent by the terminal device 1 is 2*MinDelay, and a delay from a time point at which the terminal device 2 sends the preamble to a time point at which the network device receives the preamble sent by the terminal device 2 is 2*MaxDelay. It may be understood as that a time interval from a time point at which the network device receives the first preamble (sent by the terminal device 1) to a time point at which the network device receives the last preamble (sent by the terminal device 2) is 2*MaxDelay−2*MinDelay, or may be represented by 2*(MaxDelay−MinDelay). Therefore, to ensure that the network device can receive preambles sent by all the terminal devices served by the network device, a minimum preamble receiving time window configured on the network device needs to be 2*(MaxDelay−MinDelay).

When one RO resource corresponds to one preamble receiving time window, if a RO periodicity is configured to be small, preamble receiving time windows corresponding to different RO resources may overlap. Consequently, when receiving a preamble at a time domain position of an overlapping part, the network device cannot identify a specific RO resource corresponding to the preamble, and cannot calculate a correct RA-RNTI. For example, FIG. 3 is a schematic diagram of sending preambles by different terminal devices by using different RO resources. A terminal device 1 and a terminal device 2 in FIG. 3 are the terminal devices defined in FIG. 2. The terminal device 1 selects a RO resource 1 to send a preamble, the terminal device 2 selects a RO resource 2 to send a preamble, and a preamble receiving time window corresponding to the RO resource 1 and a preamble receiving time window corresponding to the RO resource 2 have an overlapping part in time domain. Consequently, when receiving a preamble at a time domain position of the overlapping part, a network device cannot identify a specific RO resource corresponding to the preamble, and cannot calculate a correct RA-RNTI. If a RO periodicity is enlarged, a random access capacity of an entire system is reduced.

SUMMARY

This application provides a random access method and apparatus, to increase a success rate of accessing a network device by a terminal device without reducing a random access capacity of an entire system.

According to a first aspect, this application provides a random access method. The method includes: A terminal device receives at least one random access channel RACH resource from a network device. The terminal device selects a RACH resource based on a positioning capability of the terminal device. The terminal device sends a random access preamble based on the selected RACH resource. Based on this solution, when the positioning capability of the terminal device is that positioning is supported, the terminal device may adjust, based on the positioning capability, time for sending the random access preamble on the RACH resource. Therefore, the network device receives, at the same time, in a small time range, or in a short preamble receiving time window, random access preambles sent on a same RACH resource, and receives, at different time, in different small time ranges, or in different short preamble receiving time windows, random access preambles sent on different RACH resources, to help avoid a problem that random access preamble receiving time windows overlap. When the positioning capability of the terminal device is that positioning is not supported, the network device may configure a corresponding RACH resource periodicity to be large. Therefore, the network device receives, at the same time, random access preambles sent on a same RACH resource, and receives, at different time, random access preambles sent on different RACH resources, to help avoid a problem that random access preamble receiving time windows overlap. Therefore, a success rate of accessing the network device by the terminal device can be increased without reducing a random access capacity of an entire system.

In a possible implementation, when the positioning capability of the terminal device is that positioning is not supported, the terminal device selects a RACH resource corresponding to the positioning capability that positioning is not supported; or when the positioning capability of the terminal device is that positioning is supported, the terminal device selects a RACH resource corresponding to the positioning capability that positioning is supported. Based on this solution, the positioning capability of the terminal device includes that positioning is not supported and that positioning is supported. Correspondingly, RACH resources configured by the network device may be classified into a RACH resource corresponding to the positioning capability that positioning is not supported and a RACH resource corresponding to the positioning capability that positioning is supported.

In a possible implementation, when the positioning capability of the terminal device is that positioning is supported, that the terminal device selects a RACH resource corresponding to the positioning capability that positioning is supported includes: When the positioning capability of the terminal device is that positioning is supported, and a positioning precision of the terminal device is a first positioning precision, the terminal device selects a RACH resource corresponding to the first positioning precision. Based on this solution, positioning capabilities of terminal devices are classified into not supporting positioning, supporting the first positioning precision, supporting a second positioning precision, and the like. Correspondingly, RACH resources configured by the network device may he classified into a RACH resource corresponding to the positioning capability that positioning is not supported, a RACH resource corresponding to the first positioning precision, a RACH resource corresponding to the second positioning precision, and the like. When the positioning precision of the terminal device is the first positioning precision, the terminal device selects the RACH resource corresponding to the first positioning precision, to send the random access preamble.

In a possible implementation, when the positioning capability of the terminal device is that positioning is supported, that the terminal device sends a random access preamble based on the selected RACH resource includes: The terminal device determines a time adjustment value based on a position of the terminal device and a position of the network device; and the terminal device sends the random access preamble based on the time adjustment value and the selected RACH resource. Based on this solution, when the terminal device supports positioning, the terminal device may determine the time adjustment value, and send the random access preamble based on the time adjustment value and the selected RACH resource. Therefore, the network device receives, at the same time, random access preambles sent on a same RACH resource, and receives, at different time, random access preambles sent on different RACH resources, to help avoid a problem that random access preamble receiving time windows overlap. Because a RA-RNTI can be correctly calculated, the success rate of accessing the network device by the terminal device can he increased.

In a possible implementation, the terminal device may further receive time information from the network device, where the time information is used to indicate time at which the network device expects to receive the random access preamble or indicate a reference timing advance. That the terminal device determines a time adjustment value based on a position of the terminal device and a position of the network device includes: The terminal device determines the time adjustment value based on the position of the terminal device, the position of the network device, and the time information. Based on this solution, the terminal device may determine a value of the time adjustment value.

In a possible implementation, the terminal device may further receive indication information of the at least one RACH resource broadcast by the network device, where the indication information is used to indicate a positioning capability corresponding to the at least one RACH resource. Based on this solution, the terminal device may learn of the positioning capability of a terminal device and the corresponding at least one RACH resource broadcast by the network device, and may select a corresponding RACH resource based on the positioning capability of the terminal device.

In a possible implementation, after sending the random access preamble based on the selected RACH resource, if the terminal device meets a resource reselection condition, the terminal device may further reselect a RACH resource from the at least one RACH resource; and the terminal device sends the random access preamble based on the reselected RACH resource. The resource reselection condition includes at least one of the following: a quantity of times the terminal device sends the random access preamble reaches or exceeds a preset maximum quantity of times; and a timer expires, where the timer starts after the terminal device sends the random access preamble for the first time. Based on this solution, when the terminal device fails to send the random access preamble, if the resource reselection condition is met, the terminal device may reselect a RACH resource to send the random access preamble, to increase a success rate of sending the random access preamble.

In a possible implementation, that the terminal device reselects a RACH resource from the at least one RACH resource includes: If the RACH resource currently selected by the terminal device is a RACH resource corresponding to the positioning capability that positioning is supported, the terminal device reselects, from the at least one RACH resource, a RACH resource corresponding to the positioning capability that positioning is not supported; if the RACH resource currently selected by the terminal device is a RACH resource corresponding to a second positioning precision, the terminal device reselects, from the at least one RACH resource, a RACH resource corresponding to a third positioning precision, where the third positioning precision is lower than the second positioning precision; or the terminal device reselects the RACH resource from the at least one RACH resource based on an indication of the network device.

According to a second aspect, this application provides a random access method. The method includes: A network device broadcasts at least one RACH resource. The network device receives a random access preamble sent by a terminal device based on a selected RACH resource, where the selected RACH resource is selected based on a positioning capability of the terminal device. Based on this solution, when the positioning capability of the terminal device is that positioning is supported, the terminal device may adjust, based on the positioning capability, time for sending the random access preamble on the RACH resource. Therefore, the network device receives, at the same time, in a small time range, or in a short preamble receiving time window, random access preambles sent on a same RACH resource, and receives, at different time, random access preambles sent on different RACH resources, to help avoid a problem that random access preamble receiving time windows overlap. When the positioning capability of the terminal device is that positioning is not supported, the network device may configure a corresponding RACH resource periodicity to be large. Therefore, the network device receives, at the same time, random access preambles sent on a same RACH resource, and receives, at different time, in different small time ranges, or in different short preamble receiving time windows, random access preambles sent on different RACH resources, to help avoid a problem that random access preamble receiving time windows overlap. Therefore, a success rate of accessing the network device by the terminal device can be increased without reducing a random access capacity of an entire system.

In a possible implementation, the at least one RACH resource broadcast by the network device includes a RACH resource corresponding to a positioning capability that positioning is supported and/or a RACH resource corresponding to a positioning capability that positioning is not supported.

In a possible implementation, the at least one RACH resource broadcast by the network device includes RACH resources corresponding to different positioning precisions and/or a RACH resource corresponding to a positioning capability that positioning is not supported.

In a possible implementation, the network device may further broadcast time information, where the time information is used to indicate time at which the network device expects to receive the random access preamble or indicate a reference timing advance.

In a possible implementation, the network device may further broadcast indication information of the at least one RACH resource, where the indication information is used to indicate a positioning capability corresponding to the at least one RACH resource.

According to a third aspect, this application provides a random access apparatus. The apparatus may be a terminal device, or may be a chip used in the terminal device. The apparatus has a function of implementing the embodiments of the first aspect. The function may be implemented by hardware, or may be implemented by hardware by executing corresponding software. The hardware or the software includes one or more modules corresponding to the foregoing function.

According to a fourth aspect, this application provides a random access apparatus. The apparatus may be a network device, or may be a chip used in the network device. The apparatus has a function of implementing the embodiments of the second aspect. The function may be implemented by hardware, or may be implemented by hardware by executing corresponding software. The hardware or the software includes one or more modules corresponding to the foregoing function.

According to a fifth aspect, this application provides a random access apparatus, including a processor and a memory. The memory is configured to store computer-executable instructions. When the apparatus runs, the processor executes the computer-executable instructions stored in the memory, so that the apparatus performs the method according to either of the foregoing aspects.

According to a sixth aspect, this application provides a random access apparatus. The apparatus includes units or means (means) configured to perform the steps in either of the foregoing aspects.

According to a seventh aspect, this application provides a random access apparatus, including a processor and an interface circuit. The processor is configured to: communicate with another apparatus through the interface circuit, and perform the method according to either of the foregoing aspects. There are one or more processors.

According to an eighth aspect, this application provides a random access apparatus, including a processor. The processor is configured to be connected to a memory and invoke a program stored in the memory, to perform the method according to either of the foregoing aspects. The memory may be located inside the apparatus, or may be located outside the apparatus. addition, there are one or more processors.

According to a ninth aspect, this application further provides a computer-readable storage medium. The computer-readable storage medium stores instructions. When the instructions are run on a computer, the computer is enabled to perform the method according to either of the foregoing aspects.

According to a tenth aspect, this application further provides a computer program product including instructions. When the computer program product runs on a computer, the computer is enabled to perform the method according to either of the foregoing aspects.

According to an eleventh aspect, this application further provides a chip system including a processor, configured to perform the method according to either of the foregoing aspects.

According to a twelfth aspect, this application further provides a communication system, including the terminal device configured to perform any method according to the first aspect and the network device configured to perform any method according to the second aspect.

Figure 6:
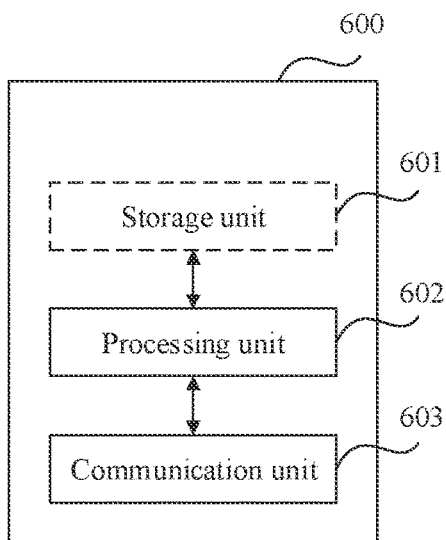
Figure 7:
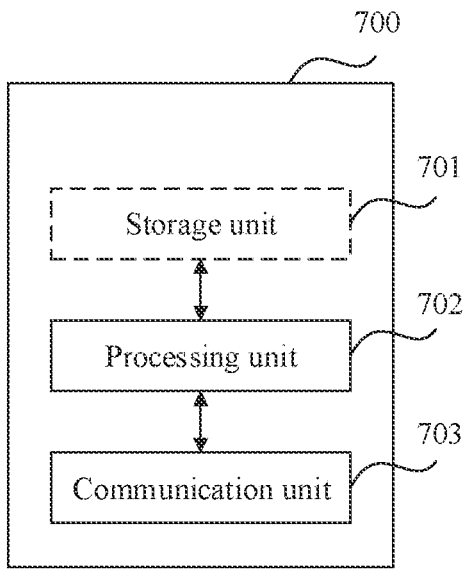
Figure 8:
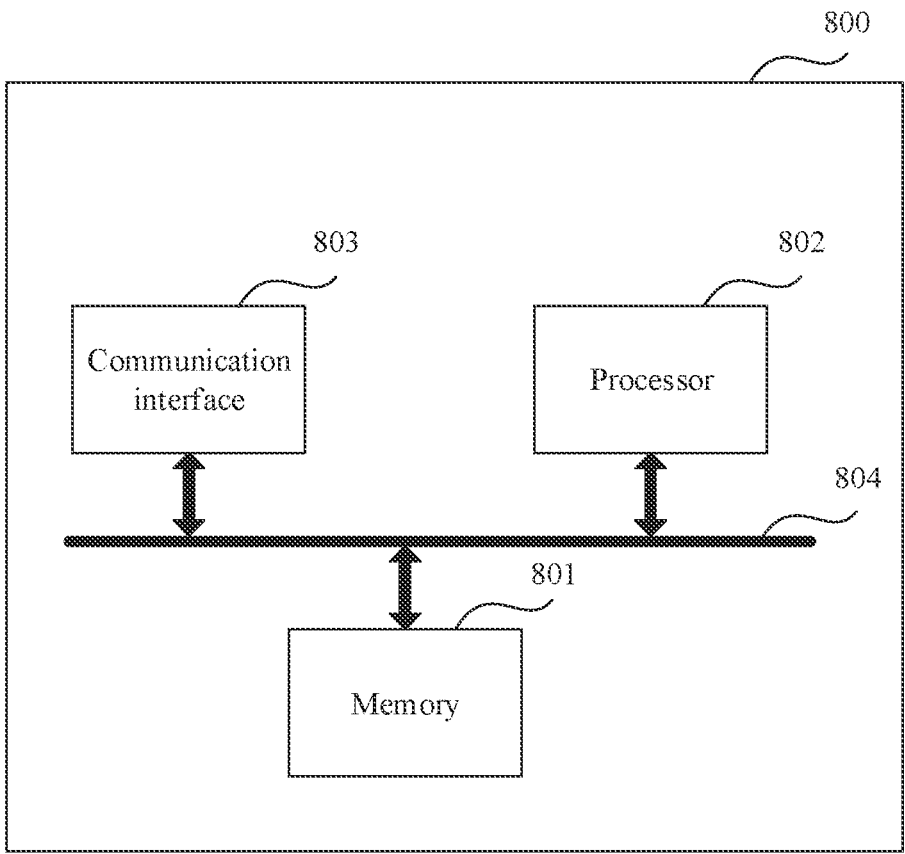

FIG, 5 is a schematic diagram of sending preambles by different terminal devices by using a same RO resource according to this application;

FIG. 6 is a schematic diagram of a random access apparatus according to this application;

FIG. 7 is a schematic diagram of a random access apparatus according to this application; and FIG. 8 is a schematic diagram of a random access apparatus according to this application.

DETAILED DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise stated. "a plurality of" means two or more than two.

Figure 1:
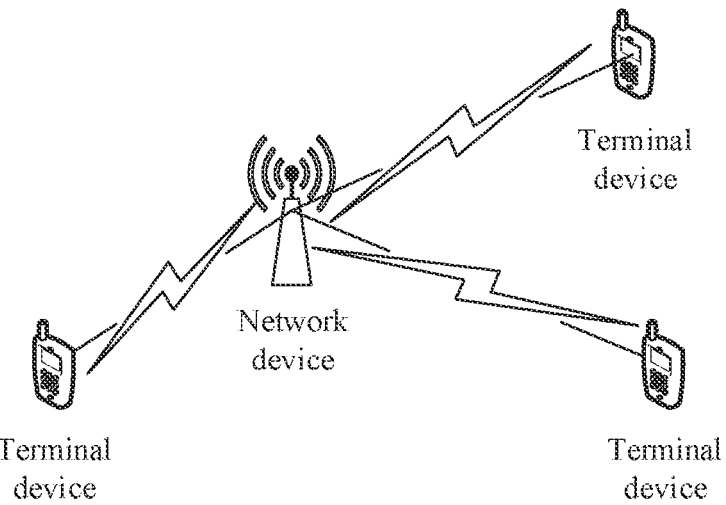
FIG. 1 is a schematic diagram of a possible network architecture according to this application.

FIG. 1 is a schematic diagram of a possible network architecture to which this application is applicable. The architecture includes a network device and at least one terminal device. The network device and the terminal device may work in a new radio (new radio, NR) communication system, and the terminal device may communicate with the network device through the NR communication system. Alternatively, the network device and the terminal device may work in another communication system. This is not limited in embodiments of this application.

The terminal device (user equipment, UE) may be a wireless terminal device that can receive scheduling and indication information of the network device. The wireless terminal device may be a device that provides a user with voice and/or data connectivity, a handheld device having a wireless connection function, or another processing device connected to a wireless modem. The wireless terminal device may communicate with one or more core networks or the internet through a radio access network (radio access network, RAN). The wireless terminal device may be a mobile terminal device, such as a mobile phone (or referred to as a "cellular" phone or a mobile phone (mobile phone)), a computer, and a data card, for example, may be a portable, pocket-sized, handheld, computer built-in, or in-vehicle mobile apparatus that exchanges language and/or data with the radio access network. For example, the device may include a personal communication service (personal communication service, PCS) phone, a cordless phone, a session initiation protocol (SIP) phone, a wireless local loop (wireless local loop, WLL) station, a personal digital assistant (personal digital assistant, PDA), a tablet computer (Pad), and a computer having a wireless transceiver function. The wireless terminal device may also be referred to as a system, a subscriber unit (subscriber unit), a mobile station (mobile station, MS), a remote station (remote station), an access point (access point, AP), a remote terminal (remote terminal a access terminal (access terminal), a user terminal (user terminal), a user agent (user agent), a subscriber station (subscriber station, SS), customer premises equipment (customer premises equipment, CPE), a terminal (terminal), user equipment (user equipment, UE), a mobile terminal (mobile terminal, MT), or the like. Alternatively, the wireless terminal device may be a wearable device and a terminal device in a next-generation communication system such as a 5G network, a terminal device in a future evolved public land mobile network (public land mobile network, PLMN), a terminal device in an NR communication system, or the like.

The network device is an entity used to transmit or receive a signal on a network side, for example, a generation NodeB (generation NodeB, gNodeB). The network device may be a device configured to communicate with a mobile device. The network device may be an AP in a wireless local area network (wireless local area network, WLAN), a base transceiver station (base transceiver station, BTS) in a global system for mobile communications (global system for mobile communications, GSM) or code division multiple access (code division multiple access, CDMA), a NodeB (NodeB, NB) in wideband code division multiple access (wideband code division multiple access, WCDMA), an evolved NodeB (evolved NodeB, eNB or eNodeB) in long term evolution (long term evolution, LTE), a relay station, an access point, a vehicle-mounted device, a wearable device, a network device in a future 5G network, a network device in a future evolved public land mobile network (public land mobile network, PLMN), a gNodeB in an NR system, or the like. In addition, in the embodiments of this application, the network device serves a cell, and the terminal device communicates with the network device by using a transmission resource (for example, a frequency domain resource, namely, a spectrum resource) used for the cell. The cell may be a cell corresponding to the network device (for example, a base station). The cell may belong to a macro base station, or may belong to a base station corresponding to a small cell (small cell). The small cell herein may include a metro cell (Metro cell), a micro cell (Micro cell), a pico cell (Pico cell), a femto cell (Fermto cell), and the like. These small cells have features of small coverage and low transmit power, and are applicable to providing a high-rate data transmission service. In addition, in another possible case, the network device may he another apparatus that provides a wireless communication function for the terminal device. A specific technology and a specific device form that are used by the network device are not limited in the embodiments of this application. For ease of description, in the embodiments of this application, the apparatus that provides the wireless communication function for the terminal device is referred to as the network device.

To resolve the problem mentioned in the background, this application provides a solution. In the solution, a network device configures different RACH resources (or referred to as RO resources) for terminal devices with different positioning capabilities. Alternatively, it is understood that the network device configures different RACH resources for different types of terminal devices, and one type corresponds to one positioning capability.

In an implementation, positioning capabilities of the terminal device may be classified into supporting positioning and not supporting positioning.

In another implementation, terminal devices that support positioning are further classified based on positioning precisions, that is, positioning capabilities of terminal devices may be classified into not supporting positioning, supporting a first positioning precision, and supporting a second positioning precision, or may be classified into not supporting positioning, supporting a first positioning precision, supporting a second positioning precision, and supporting a third positioning precision, or may be classified into not supporting positioning, supporting a first positioning precision, supporting a second positioning precision, supporting a third positioning precision, and supporting a fourth positioning precision, or the like. A quantity of classified positioning precisions is not specifically limited. The first positioning precision, the second positioning precision, the third positioning precision, and the fourth positioning precision are different from each other. For example, positioning capabilities of terminal devices may be classified into not supporting positioning, supporting a positioning precision of one meter, and supporting a positioning precision of 10 centimeters. For another example, positioning capabilities of terminal devices may be classified into not supporting positioning, supporting a positioning precision of one meter, supporting a positioning precision of 10 centimeters, and supporting a positioning precision of one centimeter.

That a terminal device supports positioning means that the terminal device has a capability of performing positioning on the terminal device. For example, the terminal device has a global positioning system (Global Positioning System, GPS) positioning capability, and may obtain position information (for example, latitude and longitude information or cell information) of the terminal device through positioning. For another example, the terminal device has a BeiDou positioning capability, and may obtain position information (for example, latitude and longitude information or cell information) of the terminal device through positioning. For still another example, the terminal may obtain position information (for example, latitude and longitude information or cell information) of the terminal according to another positioning method. One terminal device may support one positioning precision. Alternatively, one terminal device may support a plurality of positioning precisions (for example, using different positioning precisions in different modes), and during specific use, the terminal device may select one of the positioning precisions.

That a terminal device does not support positioning means that the terminal device does not have a capability of performing positioning on the terminal device.

Figure 4:
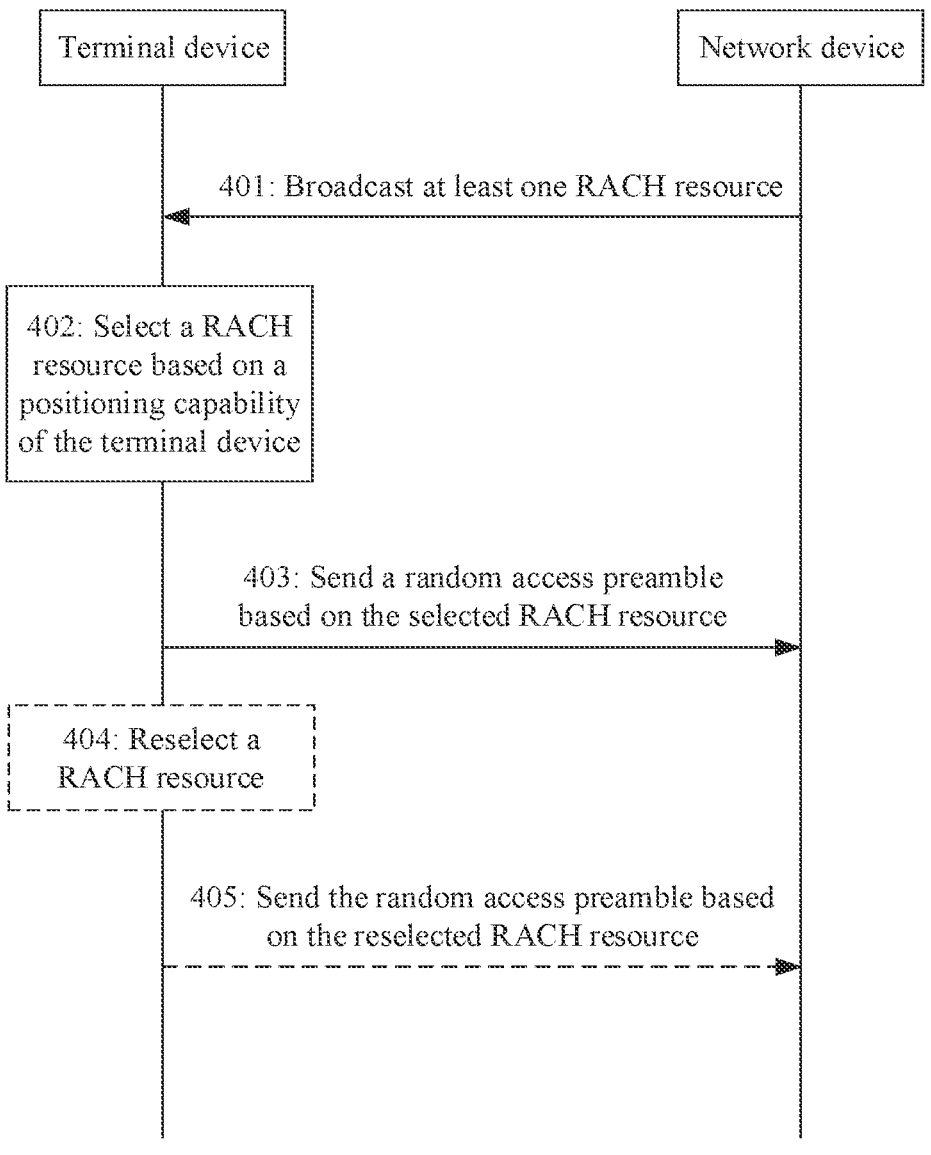
FIG. 4 is a schematic flowchart of a random access method according to this application.

Based on the architecture shown in FIG. 1, as shown in FIG. 4, this application provides a random access method. The method may be used to resolve the problem in the background. The method includes the following steps.

Step 401: A network device broadcasts at least one RACH resource, and a terminal device receives the at least one RACH resource.

The at least one RACH resource broadcast by the network device is related to a positioning capability of the terminal device. The following provides different implementations.

Implementation 1: The network device broadcasts two sets of RACH resources. One set of RACH resources corresponds to a positioning capability that positioning is supported (that is, this set of RACH resources is used by a terminal device that supports positioning), and the other set of RACH resources corresponds to a positioning capability that positioning is not supported (that is, this set of RACH resources is used by a terminal device that does not support positioning).

A set of RACH resources includes at least one of a time domain position of a RO, a frequency domain position of the RO, and a code domain resource of the RO.

For the set of RACH resources corresponding to the positioning capability that positioning is not supported, the RACH resources may be sparse, that is, may be sparse in time domain or in frequency domain.

Figure 3:
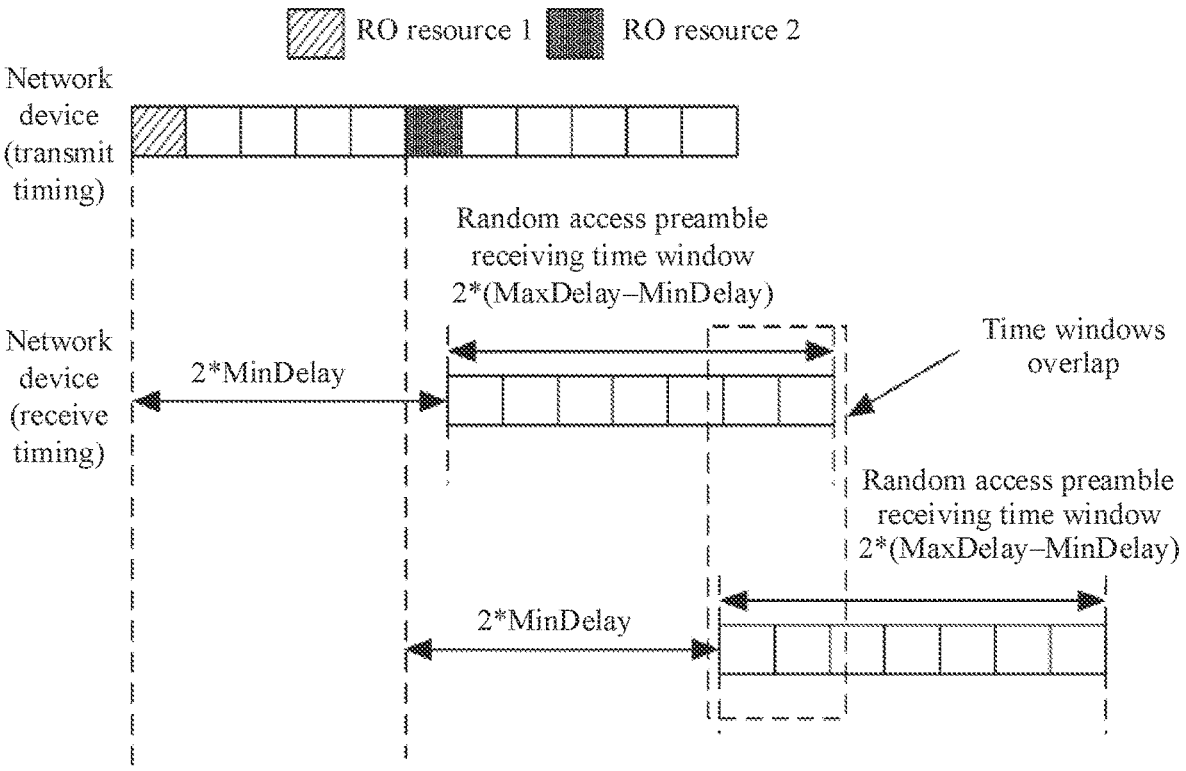
FIG. 3 is a schematic diagram of sending preambles by different terminal devices by using different RO resources in a current technology.

When the RACH resources are sparse in time domain, a periodicity of this set of RACH resources is relatively large. Therefore, when the terminal device that does not support positioning uses different RACH resources in this set of RACH resources to send preambles, the problem shown in FIG. 3 that preamble receiving time windows overlap is avoided. For example, the periodicity of this set of RACH resources may be configured to 2*(MaxDelay−MinDelay). Meanings of MaxDelay and MinDelay are the same as those described above.

When the RACH resources are sparse in frequency domain, the RACH resources may be close to each other in time domain but separate in frequency domain, that is, frequency domains of different RACH resources are different. Therefore, preambles sent on sonic specific RACH resources can be sent only on some specific frequency domain resources. In this way, when receiving a preamble, the network device may learn of a specific RACH resource (that is, determine a RO) based on a frequency domain resource.

In another implementation, a correspondence between a preamble and a RACH resource may alternatively be preset. For example, the terminal device can send, on a specific RACH resource, only a preamble corresponding to the RACH resource. After receiving the preamble, the network device may determine, based on the preamble, the specific RACH resource (that is, determine a RO) on which the preamble is sent. For example, it is assumed that preambles are classified into two groups: A and B. Only preambles in the group A can be sent on some ROs (for example, odd-numbered ROs), and only preambles in the group B can be sent on some other ROs (for example, even-numbered ROs). In this way, preambles sent on adjacent ROs are different. Even if receiving windows corresponding to two ROs overlap, the network device can determine a specific RO to which a preamble belongs after receiving the preamble. By analogy, this example may be extended to a case of a plurality of groups of preambles.

For the set of RACH resources corresponding to the positioning capability that positioning is supported, no special processing needs to he performed when the RACH resources are configured (that is, the RACH resources do not need to be sparse). The terminal device that supports positioning may determine a time adjustment value, and adjust, based on the time adjustment value, time for sending a preamble when sending the preamble, so that preambles sent on different ROs are received by the network device at different time. This helps avoid the problem that preamble receiving time windows overlap.

Implementation 2: The network device broadcasts two or more sets of RACH resources. One set of RACH resources corresponds to a positioning capability that positioning is not supported (that is, this set of RACH resources is used by a terminal device that does not support positioning), and each of other sets of RACH resources corresponds to a positioning precision (that is, a specific set of RACH resources is used by a terminal device with a specific positioning precision).

For example, terminal devices are classified into:

Type 1: a terminal device that does not support positioning;

Type 2: a terminal device with a positioning precision of one meter;

Type 3: a terminal device with a positioning precision of 10 centimeters;

Type 4: a terminal device with a positioning precision of one centimeter; and

It should be noted that the foregoing provides only some examples of positioning precisions of terminal devices and the positioning precisions of the terminal devices include but are not limited to the foregoing positioning precisions during actual application.

In addition, the terminal devices may alternatively be classified based on an indicator other than the positioning precision. The present invention is not limited to classification based on the positioning precision. For example, the terminal devices are classified based on an indicator. For example, terminal devices having different indicators correspond to different types, and different RACH resources are allocated to different types of terminal devices. For another example, the terminal devices may alternatively be classified based on performance. For example, terminal devices having different performance correspond to different types, and different RACH resources are allocated to different types of terminal devices.

In this implementation, an implementation for configuring a RACH resource for the terminal device that does not support positioning (that is, a RACH resource corresponding to the positioning capability that positioning is not supported) is the same as the implementation for configuring the RACH resource for the terminal device that does not support positioning in the implementation 1. For details, refer to the foregoing descriptions, and details are not described herein again.

In this implementation, RACH resources configured for terminal devices that support positioning are further classified into a plurality of sets based on positioning precisions, and a specific set of RACH resources is configured to be used by a terminal device with a specific positioning precision. Therefore, terminal devices with a same positioning precision use a same set of RACH resources, and terminal devices with different positioning precisions use different sets of RACH resources. For a set of RACH resources configured for different terminal devices with a same positioning precision, no special processing needs to be performed when the RACH resources are configured (that is, the RACH resources do not need to be sparse). These terminal devices that support positioning may determine time adjustment values, and when sending preambles, adjust, based on the time adjustment values, time for sending the preambles, so that the preambles sent on different ROs are received by the network device at different time. This helps avoid the problem that preamble receiving time windows overlap.

Implementation 3: The network device broadcasts one set of RACH resources. This set of RACH resources corresponds to a positioning capability that positioning is not supported (that is, this set of RACH resources is used by a terminal device that does not support positioning), or this set of RACH resources corresponds to a positioning capability that positioning is supported (that is, this set of RACH resources is used by a terminal device that supports positioning).

In this implementation, only one set of RACH resources is broadcast, and this set of broadcast resources may correspond to the positioning capability that positioning is not supported or the positioning capability that positioning is supported.

For the foregoing implementation 1 to implementation 3, in an implementation, the network device may further broadcast indication information when broadcasting the at least one RACH resource. The indication information is used to indicate a positioning capability corresponding to each set of broadcast RACH resources. That is, the indication information indicates a specific positioning capability of a terminal device for which each set of RACH resources is configured for use. For example, during specific implementation, the indication information may be a positioning precision or a positioning precision range. For example, when the positioning precision is one meter, it indicates that this set of RACH resources is configured to be used by a terminal device with a positioning precision of one meter. For example, when the positioning precision is null or a special value, it indicates that this set of RACH resources is configured to be used by a terminal device that does not support positioning. For example, when the positioning precision range is 10 centimeters to one meter, it indicates that this set of RACH resources is configured to be used by a terminal device with a positioning precision having a value between 10 centimeters and one meter. For another example, during specific implementation, the indication information may alternatively be a type of a terminal device. For example, it is predefined in a protocol or preconfigured that a type 1 indicates a terminal device that does not support positioning, a type 2 indicates a terminal device with a positioning precision of one meter, and a type 3 indicates a terminal device with a positioning precision of 10 centimeters. For example, when the indication information corresponding to the at least one RACH resource broadcast by the network device indicates the type 2, it indicates that this set of RACH resources is configured to be used by a terminal device with the type 2 or a terminal device with a positioning precision of one meter.

Step 402: The terminal device selects a RACH resource based on the positioning capability of the terminal device.

For example, when positioning capabilities of terminal devices are classified into supporting positioning and not supporting positioning, a terminal device that supports positioning selects, from the at least one broadcast RACH resource, a RACH resource corresponding to the positioning capability that positioning is supported, and a terminal device that does not support positioning selects, from the at least one broadcast RACH resource, a RACH resource corresponding to the positioning capability that positioning is not supported. During specific implementation, it may be learned, based on the indication information described above, whether each set of RACH resources is configured to be used by a terminal device that supports positioning or a terminal device that does not support positioning.

For another example, when positioning capabilities of terminal devices are classified into not supporting positioning and supporting each of one or more positioning precisions, a terminal device that does not support positioning selects, from the at least one broadcast RACH resource, a RACH resource corresponding to the positioning capability that positioning is not supported, a terminal device that supports a first positioning precision selects, from the at least one broadcast RACH resource, a RACH resource corresponding to the first positioning precision, a terminal device that supports a second positioning precision selects, from the at least one broadcast RACH resource, a RACH resource corresponding to the second positioning precision, a terminal device that supports a third positioning precision selects, from the at least one broadcast RACH resource, a RACH resource corresponding to the third positioning precision, and so on. During specific implementation, it may be learned, based on the indication information described above, whether each set of RACH resources is configured to be used by a terminal device with a specific positioning precision or a terminal device that does not support positioning.

Step 403: The terminal device sends a preamble based on the selected RACH resource.

For the terminal device, there are two cases:

Case 1: If the terminal device does not support positioning, the terminal device directly sends the preamble based on the RACH resource, where the RACH resource indicates a time domain position and a frequency domain position that are used to send the preamble. As described above, because a RACH resource periodicity is large, that is, the RACH resource used by the terminal device is a sparse resource, the problem that preamble receiving time windows overlap is avoided.

Case 2: If the terminal device supports positioning, the terminal device determines a time adjustment value based on a position of the terminal device and a position of the network device that are obtained through positioning, and then sends the preamble based on the time adjustment value and the selected RACH resource. That is, when the terminal device supports positioning, the terminal device may adjust time for sending the preamble, so that time at which preambles sent on different RACH resources arrive at the network device does not overlap. Therefore, the problem that preamble receiving time windows overlap can also be resolved. Further, because the problem that preamble receiving time windows overlap is resolved in this solution, a preamble receiving time window with a large periodicity does not need to be configured. Therefore, more RACH resources can be configured, a RACH capacity is improved, a collision occurrence probability in a random access procedure of the terminal device is reduced, and a random access success rate is increased.

In an implementation, a method for learning of the network device by the terminal device may be, for example, as follows: The terminal device may determine a constellation diagram or a running track diagram of positions of the network device, to learn of positions of the network device at different moments. Manners of determining the constellation diagram or the running track diagram of the positions of the network device include but are not limited to the following manners.

(1) The constellation diagram or the running track diagram of the positions of the network device is sent through broadcast of the network device.

(2) The constellation diagram or the running track diagram of the positions of the network device is preset in the terminal device.

(3) The network device broadcasts an indication or an index, and the terminal device determines, in a protocol or in a preset mapping table, the constellation diagram or the running track diagram of the positions of the network device based on the indication or the index, The following describes a specific implementation in which the terminal device sends the preamble in the case 2.

In an implementation, the network device may send time information by using broadcast or radio resource control (Radio Resource Control, RRC) signaling. The time information is used to indicate time at which the network device expects to receive the preamble or indicate a reference timing advance (Timing advance, TA). Therefore, the terminal device may determine the time adjustment value based on the position of the terminal device, the position of the network device, and the time information. Further, time information in the selected RACH resource is adjusted based on the time adjustment value, to obtain adjusted time for sending the preamble.

For example, the time at which the network device expects to receive the preamble may be time at which or a time range in which the network device expects to receive the preamble relative to a time point at which the network device sends the RO resource. In other words, the network device indicates a specific moment at which or a specific time range in which the preamble sent on the RO resource needs to arrive at the network device. A method for indicating the time range may be indicating a maximum moment and a minimum moment, to help the terminal device determine the time adjustment value and further determine a sending moment of the preamble. Alternatively, the time at which the network device expects to receive the preamble may be absolute time.

The following provides different implementations in which the terminal device determines the time adjustment value.

In the following implementations, X represents the time adjustment value, and T1 represents a transmission delay between the terminal device and the network device, where $T1 = $ distance between the terminal device and the network device/speed of light.

Implementation 1: The terminal device determines the time adjustment value based on the position of the terminal device and the position of the network device, for example, $X = T1$.

It should be noted that specific values of T1 corresponding to different terminal devices may be the same or may be different, and a specific value of T1 is related to a distance between the terminal device and the network device.

Implementation 2: The terminal device determines the time adjustment value based on the position of the terminal device, the position of the network device, and the reference timing advance (represented by T2), for example, $X = T1 - T2$.

T2 herein may be a cell-level reference time value, or may be a transmission delay between a specific terminal device and the network device, or may be a transmission delay between a position (where there is no terminal device at the position) and the network device. The value T2 may be sent by the network device through broadcast, or may be determined by the terminal device with reference to a broadcast indication of the network device and a protocol specification.

It should be noted that if $T1 - T2$ is a positive value, it indicates that sending time is advanced; if $T1 - T2$ is a negative value, it indicates that sending time is delayed.

The value T2 is the same for different terminal devices.

Implementation 3: The terminal device determines the time adjustment value based on the position of the terminal device, the position of the network device, and first receiving time. The first receiving time (represented by T3) is the time at which the network device expects to receive the preamble, for example, X=|2T1−T3|.

∥ herein means taking an absolute value.

T3 herein is duration for which the network device expects to receive, by using a RO resource as reference time, a preamble sent on the RO resource, or it is understood as that the network device considers that a preamble sent on a RO resource is received by the network device after the duration T3. The value T3 may be sent by the network device through broadcast, or may be determined by the terminal device with reference to a broadcast indication of the network device and a protocol specification. It should be noted that the first receiving time herein may be relative time described above, or may be absolute time. This is not limited in this application.

Figure 2:
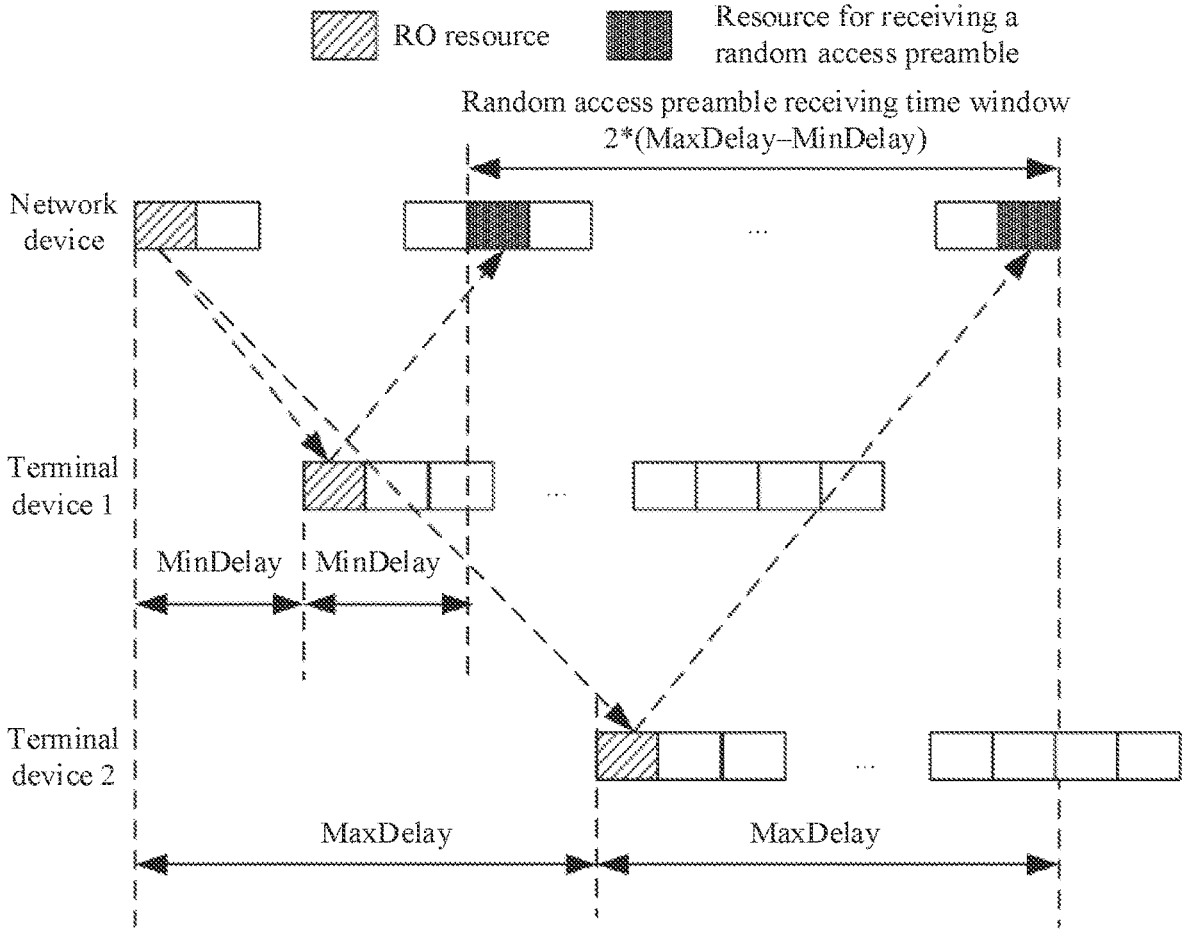
FIG. 2 is a schematic diagram of sending preambles by different terminal devices by using a same RO resource in a current technology.
Figure 5:
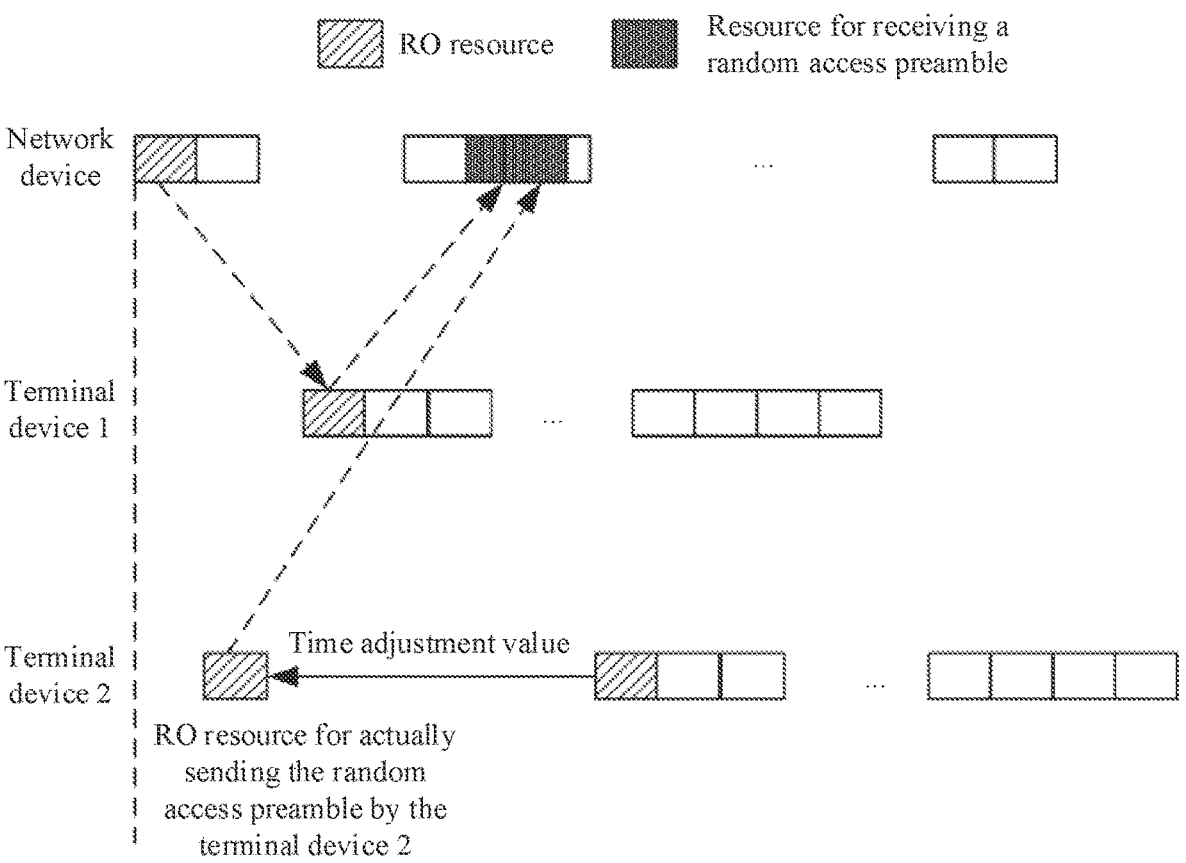

The following provides descriptions with reference to an example. FIG. 5 is a schematic diagram of sending preambles by different terminal devices by using a same RO resource according to this application. FIG. 5 is an improvement on the preamble sending method shown in FIG. 2.

It is assumed that a terminal device 2 supports positioning. In this case, the terminal device 2 may determine position information of the terminal device 2 based on a positioning function, and then determine a transmission delay between the terminal device 2 and a network device based on the position information of the terminal device 2 and position information of the network device. Further, the terminal device 2 may determine a time adjustment value based on time at which the network device expects to receive a preamble and the transmission delay, and then adjust time at which the terminal device 2 sends the preamble, so that the terminal device 2 sends the preamble based on adjusted time. Finally, a time point at which the network device receives a preamble sent by a terminal device 1 is the same or almost the same as a time point at which the network device receives the preamble sent by the terminal device 2.

It should be noted that when the network device serves a plurality of terminal devices that support positioning, time adjustment values of the terminal devices are related to distances between the terminal devices and the network device. For terminal devices that have a same distance from the network device, a same time adjustment value is used, and for terminal devices that have different distances from the network device, different time adjustment values are used. Further, a terminal device that is farther from the network device usually corresponds to a larger time adjustment value. To be specific, a terminal device that is farther from the network device should send a preamble earlier. In this way, it is possible that the preamble sent by the terminal device and a preamble sent by a terminal device that is closer to the network device arrive at the network device at the same moment or almost the same moment and are received by the network device. Alternatively, it is understood as that the network device receives, at the same time, in a small time range, or in a short preamble receiving time window, preambles sent on a same RACH resource.

According to the foregoing method, the preamble receiving time window may be eliminated or the preamble receiving time window may be narrowed. For example, for a same RO resource, if time at which the network device expects to receive a preamble is a moment (that is, a time point), terminal devices that are served by the network device and that send preambles by using the resource may respectively calculate respective time adjustment values, so that the preambles sent by the terminal devices are received by the network device at the same moment. Therefore, a size of the preamble receiving time window is 0, or it is understood as that there is no preamble receiving time window. another example, for a same RO resource, if time at which the network device expects to receive a preamble is a moment and a small error is allowed, or it is understood as that time at which a preamble is expected to be received is an extremely small time range, terminal devices that are served by the network device and that send preambles by using the RO resource may respectively calculate respective time adjustment values, so that the preambles sent by the terminal devices are received by the network device in the extremely small time range, and the extremely small time range is an extremely short preamble receiving time window. However, a preamble receiving time window in a current technology is at least 2*(MaxDelay−MinDelay). To be specific, in the current technology, because each terminal device cannot adjust time for sending a preamble by the terminal device, time points at which the network device receives preambles sent by different terminal devices differ greatly, and a time interval from a time point at which the first preamble (usually sent by a closest terminal device) is received to a time point at which the last preamble (usually sent by a farthest terminal device) is received is 2*(MaxDelay−MinDelay). In this embodiment of this application, a terminal device having the positioning capability may adjust time for sending a preamble by the terminal device, and a farther terminal device may send a preamble in advance. Therefore, time at which the network device receives preambles sent by terminal devices may be a same moment, or may be a small time range (that is, an extremely short preamble receiving time window). In this application, the preamble receiving time window is narrowed to a small range or to a moment, so that time at which the network device receives different preambles does not overlap. Therefore, in this application, the problem in the current technology that different preamble receiving time windows overlap is avoided without changing a RO resource periodicity.

Therefore, when different terminal devices that support positioning send preambles by using different RO resources, sending time may be adjusted to eliminate a preamble receiving time window or narrow a preamble receiving time window, so that a problem that preamble receiving time windows respectively corresponding to the different RO resources overlap can be avoided. In other words, for different terminal devices having the positioning capability, the problem shown in FIG. 3 that preamble receiving time windows overlap does not occur.

For the foregoing solution, in some cases, a problem that the terminal device cannot successfully access the network device by using a selected set of RACH resources may occur.

For example, when positioning capabilities of terminal devices include supporting positioning and not supporting positioning, terminal devices with any positioning precision use a same set of RACH resources (that is, a RACH resource corresponding to the positioning capability that positioning is not supported). However, the RACH resource may have a requirement on a positioning precision. For example, the RACH resource requires a positioning precision of a terminal device to be 10 centimeters. As a result, terminal devices with a positioning precision greater than 10 centimeters cannot successfully access the network device when using this set of RACH resources.

For another example, when positioning capabilities of terminal devices include not supporting positioning, supporting a first positioning precision, supporting a second positioning precision, and the like, a terminal device that supports positioning may correctly select a set of RACH resources corresponding to a positioning precision of the terminal device. However, during actual use, the terminal device may lose a positioning capability (which may be sudden transient loss or permanent function loss). In this case, when the terminal device uses this set of RACH resources, the terminal device also cannot successfully access the network device.

The following describes the foregoing problem by using a specific example. It is assumed that the terminal device sends the preamble to the network device by using a RACH resource A, and for a RO 1 of the RACH resource A, a moment at which the network device expects to receive the preamble is a moment 1. However, because a positioning precision of the terminal device is low or an error occurs on the positioning capability of the terminal device, the sent preamble cannot arrive at the network device at the moment 1. In this case, the network device cannot receive the preamble sent by the terminal device on the RO 1, and therefore does not send a RAR to the terminal device. If the terminal device receives no RAR in a specific time window, the terminal device retransmits the preamble. However, the terminal device may still receive no RAR due to a same reason, and further continue to retransmit the preamble. As a result, an access delay increases and even access always fails, and finally random access fails.

To resolve the foregoing problem that may occur, a backoff mechanism is designed in this application, to allow the terminal device to select another set of RACH resources for access under a specific condition.

In an implementation, the network device may configure a preamble sending quantity threshold (that is, a maximum quantity of sending times) for the terminal device by using broadcast or RRC signaling. It is assumed that after the terminal device selects a set of RACH resources, a quantity of times for sending the preamble is equal to or exceeds the preset maximum quantity of sending times. In this case, the terminal device may change the selected RACH resource to resend the preamble. Because a RACH resource obtained after change has a relatively low requirement on the capability of the terminal device, it is easier to successfully access the network device. When the threshold is 1, it indicates that each time after the preamble is sent, if the terminal device receives no RAR, the terminal device needs to reselect a RACH resource.

In another implementation, the network device may alternatively configure a timer in broadcast or RRC signaling. After selecting a set of RACH resources to send the preamble, the terminal device starts the timer. In other words, the timer starts after the terminal device sends the random access preamble for the first time. It is assumed that the terminal device still receives no RAR or the random access procedure still fails after the timer expires, the terminal device changes the selected RACH resource to send the preamble. Because a RACH resource obtained after change has a relatively low requirement on the capability of the terminal device, it is easier to successfully access the network device.

In conclusion, if the terminal device meets a resource reselection condition, the terminal device reselects the RACH resource from the at least one RACH resource broadcast by the network device. Then, the terminal device sends the preamble based on the reselected RACH resource. Herein, that the resource reselection condition is met means that the quantity of times for sending the preamble by the terminal device reaches or exceeds the preset maximum quantity of times and/or that the timer expires.

When determining that the terminal device needs to reselect a RACH resource, the terminal device may reselect the RACH resource in any one of the following manners:

In another implementation, if the RACH resource currently selected by the terminal device is a RACH resource corresponding to the positioning capability that positioning is supported, the terminal device reselects, from the at least one RACH resource, a RACH resource corresponding to the positioning capability that positioning is not supported.

In another implementation, if the RACH resource currently selected by the terminal device is a RACH resource corresponding to the second positioning precision, the terminal device reselects, from the at least one RACH resource, a RACH resource corresponding to the third positioning precision, where the third positioning precision is lower than the second positioning precision. Alternatively, it is understood as that the terminal device may reselect another set of RACH resources based on a backoff value (which may be indicated by the network device or preconfigured) and the selected RACH resource. For example, there are five sets of RACH resources A, B, C, D, and E, and corresponding positioning capabilities decrease sequentially. For example, the RACH resource A corresponds to a positioning precision of one centimeter, the RACH resource B corresponds to a positioning precision of 10 centimeters, the RACH resource C corresponds to a positioning precision of one meter, the RACH resource D corresponds to a positioning precision of 10 meters, and the RACH resource E corresponds to a positioning capability that positioning is not supported. It is assumed that after the terminal device selects the RACH resource A for the first time, if the quantity of times for sending the preamble by the terminal device reaches the preamble sending quantity threshold or the timer expires, the terminal device may reselect a set of RACH resources from four sets of RACH resources B, C, D, and E. For example, when the backoff value is 1, one set of RACH resources is sequentially selected from the four sets of RACH resources B, C, D, and E, until the random access procedure is successfully completed or all the RACH resources cannot be used to complete the random access procedure. For example, when the backoff value is 2, the RACH resource C is selected. If the random access procedure is successfully completed, the procedure ends, Otherwise, the terminal device continues to select the RACH resource E to attempt to complete the random access procedure.

In another implementation, the terminal device reselects the RACH resource from the at least one RACH resource based on an indication of the network device, that is, the network device explicitly indicates a specific set of RACH resources to be reselected by the terminal device to attempt to reseed the preamble.

Based on the foregoing backoff mechanism, after step 403, the network device may further indicate that after the terminal device reaches the preamble sending quantity threshold or the timer expires, the following step 404 and step 405 may be further included.

Step 404: The terminal device reselects a set of RACH resources.

A specific implementation of step 404 is described above, and details are not described herein again.

Step 405: The terminal device sends the preamble based on the reselected set of RACH resources.

Based on the foregoing backoff mechanism, a problem that the random access procedure cannot be successfully completed because the positioning precision of the terminal device is low or an error occurs on a positioning function of the terminal device is avoided.

In addition, in the foregoing embodiment, the solutions are mainly directed to an existing four-step random access procedure. Currently, to reduce a random access delay in some scenarios, a two-step random access method is also being studied. In four-step random access, the terminal device sends a MSG 1, receives a MSG 2, then sends a MSG 3, and finally receives a MSG 4. However, in two-step random access, the terminal device sends a MSG A, where the MSG A may be considered as a combination of the MSG 1 and the MSG 3 in the four-step random access; and then the terminal device receives a MSG B, where the MSG B may be considered as a combination of the MSG 2 and the MSG 4. Content of the MSG A is not limited to being the same as that of the MSG 1+MSG 3, but it is intended to indicate that functions of the MSG A and the MSG 1+MSG 3 are the same. This is the same for the MSG B. In addition, names of the MSG A and the MSG B are not limited.

In a two-step random access procedure, the method in the foregoing embodiment is also applicable. Before sending the MSG A, the terminal device may adjust time for sending the MSG A according to the method for adjusting the MSG 1 in the foregoing embodiment, so that the network device can identify a RO resource for sending the MSG A when receiving all or a part of the MSG A.

The solutions provided in this application are described above mainly from a perspective of interaction between network elements. It may be understood that in the foregoing implementations, to implement the foregoing functions, the network elements include corresponding hardware structures and/or software modules for performing the foregoing functions. A person skilled in the art should easily be aware that, in combination with the units and. algorithm steps of the examples described in the embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

FIG. 6 is a possible example block diagram of a random access apparatus according to this application. The apparatus 600 may exist in a form of software or hardware. The apparatus 600 may include a processing unit 602 and a communication unit 603. In an implementation, the communication unit 603 may include a receiving unit and a sending unit. The processing unit 602 is configured to control and manage an action of the apparatus 600. The communication unit 603 is configured to support the apparatus 600 in communicating with another network entity. The apparatus 600 may further include a storage unit 601, configured to store program code and data of the apparatus 600.

The processing unit 602 may be a processor or a controller, such as a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), another programmable logic device, a transistor logic device, a hardware component, or any combination thereof. The processing unit 602 may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The storage unit 601 may be a memory. The communication unit 603 is an interface circuit of the apparatus, and is configured to receive a signal from another apparatus. For example, when the apparatus is implemented in a form of a chip, the communication unit 603 is an interface circuit used by the chip to receive a signal from another chip or apparatus, or is an interface circuit used by the chip to send a signal to another chip or apparatus.

The apparatus 600 may be the terminal device in any one of the foregoing embodiments, or may be a chip used in the terminal device. For example, when the apparatus 600 is the terminal device, the processing unit 602 may be, for example, a processor, and the communication unit 603 may be, for example, a transceiver. Optionally, the transceiver may include a radio frequency circuit, and the storage unit may be, for example, a memory. For example, when the apparatus 600 is the chip used in the terminal device, the processing unit 602 may be, for example, a processor, and the communication unit 603 may be, for example, an input/output interface, a pin, or a circuit. The processing unit 602. may execute computer-executable instructions stored in the storage unit. Optionally, the storage unit is a storage unit inside the chip, such as a register or a buffer. Alternatively, the storage unit may be a storage unit that is inside the terminal device and that is located outside the chip, such as a read-only memory (read-only memory, ROM), another type of static storage device that can store static information and instructions, or a random access memory (random access memory, RAM).

In an embodiment, the communication unit 603 is configured to receive at least one random access channel RACH resource from a network device; the processing unit 602 is configured to select a RACH resource based on a positioning capability of the terminal device; and the communication unit 603 is further configured to send a random access preamble based on the selected RACH resource.

In a possible implementation, when the positioning capability of the terminal device is that positioning is not supported, the processing unit 602 selects a RACH resource corresponding; to the positioning capability that positioning is not supported; or when the positioning capability of the terminal device is that positioning is supported, the processing unit 602 selects a RACH resource corresponding to the positioning capability that positioning is supported.

In a possible implementation, the processing unit 602 is specifically configured to: when the positioning capability of the terminal device is that positioning is supported, and a positioning precision of the terminal device is a first positioning precision, select a RACH resource corresponding to the first positioning precision.

In a possible implementation, the processing unit 602 is further configured to determine a time adjustment value based on a position of the terminal device and a position of the network device; and the communication unit 603 is specifically configured to send the random access preamble based on the time adjustment value and the selected RACH resource.

In a possible implementation, the communication unit 603 is further configured to receive time information from the network device, where the time information is used to indicate time at which the network device expects to receive the random access preamble or indicate a reference timing advance; and the processing unit 602 is specifically configured to determine the time adjustment value based on the position of the terminal device, the position of the network device, and the time information.

In a possible implementation, the communication unit 603 is further configured to receive indication information of the at least one RACH resource broadcast by the network device, where the indication information is used to indicate a positioning capability corresponding to the at least one RACH resource.

In a possible implementation, after the random access preamble is sent based on the selected RACH resource, the processing unit 602 is further configured to: if the terminal device meets a resource reselection condition, reselect a RACH resource from the at least one RACH resource; and the communication unit 603 is further configured to send the random access preamble based on the reselected RACH resource, where the resource reselection condition includes at least one of the following: a quantity of times the communication unit 603 sends the random access preamble reaches or exceeds a preset maximum quantity of times; and a timer expires, where the timer starts after the communication unit 603 sends the random access preamble for the first time.

In a possible implementation, the processing unit 602 is specifically configured to: if the RACH resource currently selected by the processing unit 602 is a RACH resource corresponding to the positioning capability that positioning is supported, reselect, from the at least one RACH resource, a RACH resource corresponding to the positioning capability that positioning is not supported; if the RACH resource currently selected by the processing unit 602 is a RACH resource corresponding to a second positioning precision, reselect, from the at least one RACH resource, a RACH resource corresponding to a third positioning precision, where the third positioning precision is lower than the second positioning precision; or reselect the RACH resource from the at least one RACH resource based on an indication of the network device.

It may be understood that, for a specific implementation process and a corresponding beneficial effect of the apparatus when the apparatus is used for the random access method, refer to related descriptions in the foregoing method embodiment, and details are not described herein again.

FIG. 7 is a possible example block diagram of a random access apparatus according to this application. The apparatus 700 may exist in a form of software or hardware. The apparatus 700 may include a processing unit 702 and a communication unit 703. In an implementation, the communication unit 703 may include a receiving unit and a sending unit. The processing unit 702 is configured to control and manage an action of the apparatus 700. The communication unit 703 is configured to support, the apparatus 700 in communicating with another network entity. The apparatus 700 may further include a storage unit 701, configured to store program code and data of the apparatus 700.

The processing unit 702 may be a processor or a controller, for example, a CPU, a general-purpose processor, a DSP, an ASIC, an FPGA, another programmable logic device, a transistor logic device, a hardware component, or any combination thereof. The processing unit 702 may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The storage unit 701 may be a memory. The communication unit 703 is an interface circuit of the apparatus, and is configured to receive a signal from another apparatus For example, when the apparatus is implemented in a form of a chip, the communication unit 703 is an interface circuit used by the chip to receive a signal from another chip or apparatus, or is an interface circuit used by the chip to send a signal to another chip or apparatus.

The apparatus 700 may be the network device in any one of the foregoing embodiments, or may be a chip used in the network device. For example, when the apparatus 700 is the network device, the processing unit 702 may be, for example, a processor, and the communication unit 703 may be, for example, a transceiver. Optionally, the transceiver may include a radio frequency circuit, and the storage unit may be, for example, a memory. For example, when the apparatus 700 is the chip used in the network device, the processing unit 702 may be, for example, a processor, and the communication unit 703 may be, for example, an input/output interface, a pin, or a circuit. The processing unit 702 may execute computer-executable instructions stored in the storage unit. Optionally, the storage unit is a storage unit inside the chip, such as a register or a buffer. Alternatively, the storage unit may be a storage unit that is in the network device and that is located outside the chip, for example, a ROM, another type of static storage device that can store static information and instructions, or a RAM.

In an embodiment, the communication unit 703 is configured to broadcast at least one RACH resource; and the communication unit 703 is further configured to receive a random access preamble sent by a terminal device based on a selected. RACH resource, where the selected RACH resource is selected based on a positioning capability of the terminal device.

In a possible implementation, the at least one broadcast RACH resource includes a RACH resource corresponding to a positioning capability that positioning is supported and/or a RACH resource corresponding to a positioning capability that positioning is not supported.

In a possible implementation, the at least one broadcast RACH resource includes RACH resources corresponding to different positioning precisions and/or a RACH resource corresponding to a positioning capability that positioning is not supported.

In a possible implementation, the communication unit 703 is further configured to broadcast time information, where the time information is used to indicate time at which the apparatus expects to receive the random access preamble or indicate a reference timing advance.

In a possible implementation, the communication unit 703 is further configured to broadcast indication information of the at least one RACH resource, where the indication information is used to indicate a positioning capability corresponding to the at least one RACH resource.

It may be understood that, for a specific implementation process and a corresponding beneficial effect of the apparatus when the apparatus is used for the random access method, refer to related descriptions in the foregoing method embodiment, and details are not described herein again.

FIG. 8 is a schematic diagram of a random access apparatus according to this application. The apparatus may be the terminal device or the network device in the foregoing embodiment. The apparatus 800 includes a processor 802, a communication interface 803, and a memory 801. Optionally, the apparatus 800 may further include a communication line 804. The communication interface 803, the processor 802, and the memory 801 may be connected to each other through the communication line 804. The communication line 804 may be a peripheral component interconnect (peripheral component interconnect, PCI for short) bus, an extended industry standard architecture (extended industry standard architecture, EISA for short) bus, or the like. The communication line 804 may be classified into an address bus, a data bus, a control bus, and the like. For ease of representation, only one thick line is used to represent the bus in FIG. 8, but this does not mean that there is only one bus or only one type of bus.

The processor 802 may be a CPU, a microprocessor, an ASIC, or one or more integrated circuits configured to control program execution in the solutions of this application.

The communication interface 803 is configured to communicate with another device or a communication network such as the Ethernet, a radio access network (radio access network, RAN), a wireless local area network (wireless local area network, WLAN), or a wired access network by using any apparatus such as a transceiver.

The memory 801 may be a ROM, another type of static storage device that can store static information and instructions, a RAM, or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in an instruction form or a data structure form and that can be accessed by a computer. However, the memory 801 is not limited thereto. The memory may exist independently and is connected to the processor through the communication line 804. Alternatively, the memory may be integrated with the processor.

The memory 801 is configured to store computer-executable instructions for performing the solutions of this application, and the processor 802 controls the execution. The processor 802 is configured to execute the computer-executable instructions stored in the memory 801, to implement the random access method provided in the foregoing embodiment of this application.

Optionally, the computer-executable instructions in the embodiments of this application may also be referred to as application program code. This is not specifically limited in the embodiments of this application.

A person of ordinary skill in the art may understand that first, second, and various numerals in this application are merely distinguished for convenient description, and are not used to limit a scope of the embodiments of this application, and also indicate a sequence. The term "and/or" describes an association relationship for describing associated objects and represents that three relationships may exist. For example, A and/or B may represent the following three cases: Only A exists, both A and B exist, and only B exists. The character "/" generally represents an "or" relationship between the associated objects. The term "at least one" means one or more. At least two means two or more. "At least one", "any one", or a similar expression thereof means any combination of the items, including a single item (piece) or any combination of a plurality of items (pieces). For example, at least one (piece, or type) of a, b, or c may indicate: a, b, c, a and b, a and b and c, or a, b, and c, where a, b, and c may be singular or plural. "A plurality of" indicates two or more, and another quantifier is similar to this, In addition, an element (element) that appears with singular forms "a", "an", and "the" does not mean "one or only one" unless otherwise specified in the context, but means "one or more". For example, "a device" means one or more such devices.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical. fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

The various illustrative logic units and circuits described in the embodiments of this application may implement or operate the described functions through a general-purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the method or algorithm described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information into the storage medium. Optionally, the storage medium may alternatively be integrated into a processor. The processor and the storage medium may be disposed in an ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although this application is described with reference to specific features and the embodiments thereof, it is clear that various modifications and combinations may be made to this application without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A random access method, comprising:
receiving, by a terminal device, a plurality of random access channel (RACH) resources from a network device, wherein the plurality of RACH resources include a first RACH resource and a second RACH resource, the first RACH resource is configured for first terminal devices that each has a positioning capability, and the second RACH resource is configured for second terminal devices that each does not have the positioning capability, and wherein each of the second terminal devices does not have any positioning capability;
selecting, by the terminal device, one of the plurality of RACH resources based on the positioning capability of the terminal device; and
sending, by the terminal device, a random access preamble based on the selected RACH resource.

2. The method according to claim 1, wherein:
when the terminal device does not have the positioning capability, the terminal device selects the second RACH resource.

3. The method according to claim 1, wherein, when the terminal device has the positioning capability, sending, by the terminal device, the random access preamble based on the selected RACH resource comprises:
determining, by the terminal device, a time adjustment value based on a position of the terminal device and a position of the network device; and
sending, by the terminal device, the random access preamble based on the time adjustment value and the selected RACH resource.

4. The method according to claim 1, wherein the method further comprises:
receiving, by the terminal device, indication information of the plurality of RACH resources broadcast by the network device, wherein the indication information is used to indicate at least a first positioning capability corresponding to the first RACH resource and a second positioning capability corresponding to the second RACH resource, the first positioning capability includes the positioning capability, and the second positioning capability does not include the positioning capability.

5. The method according to claim 1, wherein, after sending, by the terminal device, the random access preamble based on the selected RACH resource, the method further comprises:
when the terminal device meets a resource reselection condition, reselecting, by the terminal device, another one of the plurality of RACH resources; and
sending, by the terminal device, the random access preamble based on the reselected RACH resource, wherein the resource reselection condition comprises at least one of the following:
a quantity of times the terminal device sends the random access preamble reaches or exceeds a preset maximum quantity of times; or
a timer expires, wherein the timer starts after the terminal device sends the random access preamble for the first time.

6. The method according to claim 5, wherein reselecting, by the terminal device, the another one of the plurality of RACH resources comprises:
when the RACH resource currently selected by the terminal device is the first RACH resource, reselecting, by the terminal device from the plurality of RACH resources, the second RACH resource;
when the RACH resource currently selected by the terminal device is a RACH resource corresponding to a first positioning precision, reselecting, by the terminal device from the plurality of RACH resources, a RACH resource corresponding to a second positioning precision, wherein the second positioning precision is lower than the first positioning precision; or
reselecting, by the terminal device, the another one of the plurality of RACH resources based on an indication of the network device, wherein the indication of the network device indicates a set of RACH resources to be reselected by the terminal device.

7. The method according to claim 6, wherein the first positioning precision includes a positioning precision of one meter or a positioning precision of 10 meters.

8. The method according to claim 1, wherein the plurality of RACH resources include a third RACH resource, the first RACH resource is configured for the first terminal devices supporting positioning with a first positioning precision, and the third RACH resource is configured for third terminal devices supporting positioning with a second positioning precision different from the first positioning precision.

9. A random access method, comprising:
broadcasting, by a network device, a plurality of random access channel (RACH) resources, wherein the plurality of RACH resources include a first RACH resource and a second RACH resource, the first RACH resource is configured for first terminal devices that each has a positioning capability, and the second RACH resource is configured for second terminal devices without that each does not have the positioning capability, and wherein each of the second terminal devices does not have any positioning capability; and
receiving, by the network device, a random access preamble sent by a terminal device based on one of the plurality of RACH resources, wherein the one of the plurality of RACH resources is selected from the plurality of RACH resources based on the positioning capability of the terminal device.

10. The method according to claim 9, wherein the plurality of RACH resources broadcast by the network device comprises RACH resources corresponding to different positioning precisions.

11. The method according to claim 9, wherein the method further comprises:

broadcasting, by the network device, indication information of the plurality of RACH resources, wherein the indication information indicates at least a first positioning capability corresponding to the first RACH resource and a second positioning capability corresponding to the second RACH resource, the first positioning capability includes the positioning capability, and the second positioning capability does not include the positioning capability.

12. A communication apparatus, comprising at least one processor, and one or more memories coupled to the at least one processor, wherein the one or more memories store programming instructions, and when executing the programming instructions stored in the one or more memories, the at least one processor executes operations comprising:

receiving a plurality of random access channel (RACH) resources from a network device, wherein the plurality of RACH resources include a first RACH resource and a second RACH resource, the first RACH resource is configured for first terminal devices that each has a positioning capability, and the second RACH resource is configured for second terminal devices that each does not have the positioning capability, and wherein each of the second terminal devices does not have any positioning capability;

selecting one of the plurality of RACH resources based on the positioning capability of the apparatus; and sending a random access preamble based on the selected RACH resource.

13. The apparatus according to claim 12, wherein:

when the apparatus does not have the positioning capability, the apparatus selects the second RACH resource; or when the apparatus has the positioning capability, the apparatus selects the first RACH resource.

14. The apparatus according to claim 13, wherein, when the apparatus has the positioning capability, sending the random access preamble based on the selected RACH resource comprises:

determining a time adjustment value based on a position of the apparatus and a position of the network device; and sending the random access preamble based on the time adjustment value and the selected RACH resource.

15. The apparatus according to claim 12, wherein the operations further comprise:

receiving indication information of the plurality of RACH resources broadcast by the network device, wherein the indication information is used to indicate at least a first positioning capability corresponding to the first RACH resource and a second positioning capability corresponding to the second RACH resource, the first positioning capability includes the positioning capability, and the second positioning capability does not include the positioning capability.

16. The apparatus according to claim 12, wherein after sending the random access preamble based on the selected RACH resource, the operations further comprise:

when the apparatus meets a resource reselection condition, reselecting another one of the plurality of RACH resources; and sending the random access preamble based on the reselected RACH resource, wherein the resource reselection condition comprises at least one of the following:

a quantity of times the apparatus sends the random access preamble reaches or exceeds a preset maximum quantity of times; or a timer expires, wherein the timer starts after the apparatus sends the random access preamble for the first time.

17. The apparatus according to claim 16, wherein reselecting the another one of the plurality of RACH resources comprises:

when the RACH resource currently selected by the apparatus is the first RACH resource, reselecting, from the plurality of RACH resources, the second RACH resource;

when the RACH resource currently selected by the apparatus is a RACH resource corresponding to a first positioning precision, reselecting, from the plurality of RACH resources, a RACH resource corresponding to a second positioning precision, wherein the second positioning precision is lower than the first positioning precision; or reselecting the another one of the plurality of RACH resources based on an indication of the network device, wherein the indication of the network device indicates a set of RACH resources to be reselected by the apparatus.

18. A communication apparatus, comprising at least one processor, and one or more memories coupled to the at least one processor, wherein the one or more memories store programming instructions, and when executing the programming instructions stored in the one or more memories, the at least one processor executes operations comprising:

broadcasting a plurality of random access channel (RACH) resources, wherein the plurality of RACH resources include a first RACH resource and a second RACH resource, the first RACH resource is configured for first terminal devices that each has a positioning capability, and the second RACH resource is configured for second terminal devices that each does not have the positioning capability, and wherein each of the second terminal devices does not have any positioning capability; and receiving a random access preamble sent by a terminal device based on one of the plurality of RACH resources, wherein the one of the plurality of RACH resources is selected from the plurality of RACH resources based on the positioning capability of the terminal device.

19. The apparatus according to claim 18, wherein the plurality of RACH resources broadcast by the apparatus comprises RACH resources corresponding to different positioning precisions.

20. The apparatus according to claim 18, wherein the at least one processor executes the operations further comprising:

broadcasting indication information of the plurality of RACH resources, wherein the indication information indicates at least a first positioning capability corresponding to the first RACH resource and a second positioning capability corresponding to the second RACH resource, the first positioning capability includes the positioning capability, and the second positioning capability does not include the positioning capability.

* * * * *